March 8, 1966  S. P. KUCKA  3,239,209
WELDING WORK POSITIONER ADAPTER FOR NONLINEAR WORKPIECES
SUCH AS ELBOWS AND THE LIKE
Filed April 21, 1964  2 Sheets-Sheet 1

INVENTOR.
Stephen P. Kucka
BY
Wolfe, Hubbard, Voit & Osann
Attys.

March 8, 1966  S. P. KUCKA  3,239,209
WELDING WORK POSITIONER ADAPTER FOR NONLINEAR WORKPIECES
SUCH AS ELBOWS AND THE LIKE
Filed April 21, 1964  2 Sheets-Sheet 2
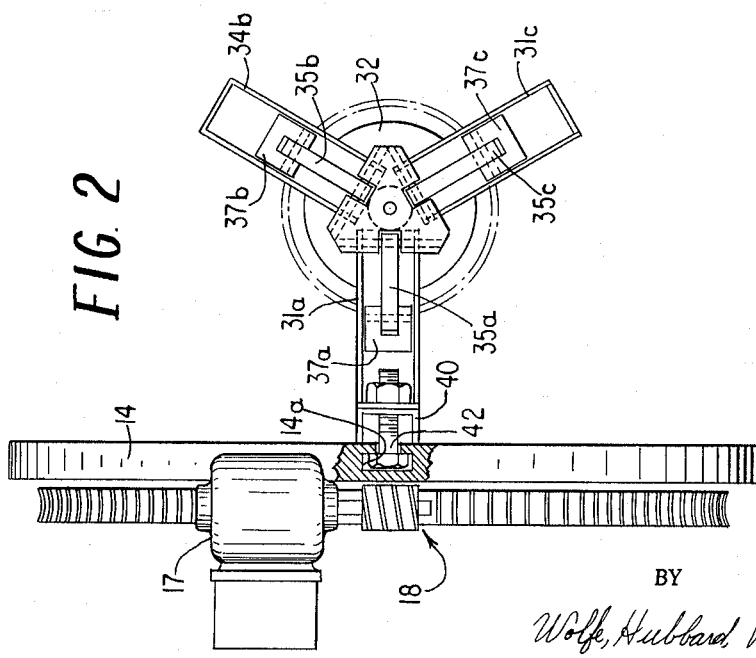
INVENTOR.
Stephen P. Kucka
BY
Wolfe, Hubbard, Voit & Osann.
Attys.

United States Patent Office
3,239,209
Patented Mar. 8, 1966

3,239,209
WELDING WORK POSITIONER ADAPTER FOR NONLINEAR WORKPIECES SUCH AS ELBOWS AND THE LIKE
Stephen P. Kucka, 1743 Central Ave., Whiting, Ind.
Filed Apr. 21, 1964, Ser. No. 361,515
4 Claims. (Cl. 269—55)

The present invention relates generally to automatic welding work positioners and, more particularly, to an improved adapter for mounting nonlinear workpieces such as elbows and the like on automatic welding work positioners.

In the welding of relatively large sections of pipe and the like, it is conventional practice today to support the workpiece horizontally on a plurality of roller assemblies, and then attach one end of the workpiece to an automatic welding work positioner which rotates the workpiece as the welding operation proceeds. This not only facilitates accurate alinement of the sections being welded, but also permits the welding operation to be carried out rapidly and conveniently without having the welder move around and underneath the joint being welded.

Although the above method is very satisfactory for the welding of straight pipe sections and other linear workpieces, certain difficulties are encountered in the welding of elbows, T-members, and other nonlinear welding fittings which cannot be easily attached to the vertical mounting table of the automatic positioner. These difficulties stem largely from the fact that the opening at the free end of such fittings is in a horizontal rather than a vertical plane, so that the fitting cannot be attached to the positioner in the usual manner. Although a number of different techniques have been devised for attaching these nonlinear fittings to the automatic positioner, the techniques proposed thus far have been uneconomical, cumbersome, and extremely time consuming.

One of the most common practices employed today is the use of the so-called "dead man" to attach the nonlinear fitting to the positioner table. The "dead man" is a supplemental metal member, or a plurality of members, which are welded onto the outside surface of the nonlinear fitting and then attached to the mounting table in the usual way. However, this requires not only the initial welding of the "dead man" onto the nonlinear fitting, but also cutting the "dead man" off the fitting after the welding operation has been completed, and subsequent grinding of the fitting to restore it to its original condition. The practical and economic shortcomings of this technique are obvious, and yet it is still in widespread use today.

It is, therefore, a primary object of the present invention to provide a novel adapter which facilitates the attachment of nonlinear welding fittings such as elbows and the like to the vertical table of an automatic welding positioner. A related object is to provide such an adapter which permits nonlinear welding fittings to be quickly and conveniently attached to the vertical table of the positioner without any supplemental welding, cutting, or grinding operations.

It is another object of this invention to provide a novel adapter which can be used to attach a wide variety of different sizes and shapes of nonlinear welding fittings to the vertical table of an automatic positioner. More particularly, it is an object to provide such an adapter which can be used with nonlinear fittings over a wide range of diameters. A further object is to provide such an adapter which holds curved pipe sections firmly in position during the rotation thereof by the automatic positioner, regardless of the diameter of the opening in the curved section.

A still further object of the invention is to provide such an adapter of the foregoing type in which the adjustments required to accommodate different nonlinear workpieces can be made rapidly and accurately in a simple manner. Yet another object is to provide such an adapter which enables the curved fitting to be accurately alined with the other section to which it is to be welded by a relatively simple manual adjustment.

Other objects and advantages of the invention will become apparent upon reading the following description and appended claims and upon reference to the drawings, in which:

FIG. 2 is an enlarged plan view of the adapter of FIG. 1 with the workpiece removed; and FIG. 3 is an end elevation view of the adapter of FIG. 1 looking toward the face of the turntable of the automatic positioner.

Figure 1:
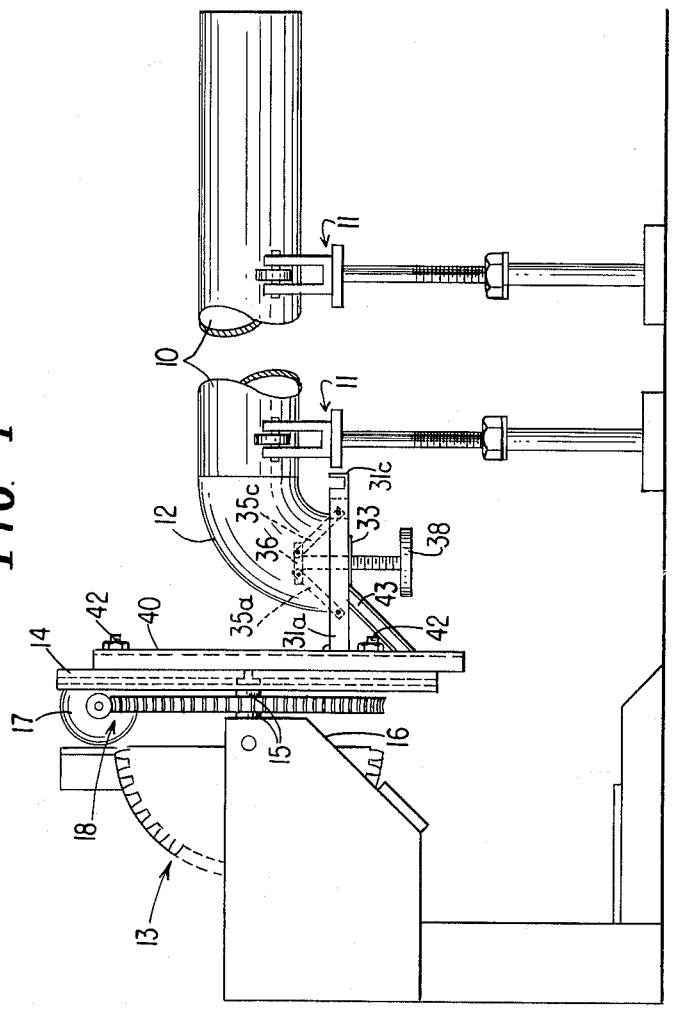
FIGURE 1 is an elevation view of the adapter of this invention mounted for use with a conventional automatic rotary welding work positioner in the welding of a curved pipe section to a straight pipe section.

While the invention will be described in connection with a preferred embodiment, it is to be understood that the invention is not to be limited to the disclosed embodiment but, on the contrary, it is intended to cover the various modifications and equivalent arrangements included within the spirit and scope of the appended claims.

Turning now to the drawings, a straight pipe section 10 is conventionally supported on a pair of spaced apart roller assemblies 11 which permit the pipe to be rotated while it is being welded to an elbow pipe section 12. A small initial weld is made between the two sections while they are still stationary so that the two sections can be subsequently rotated together by means of a rotary welding work positioner 13. Thus, the entire joint between the two sections 10 and 12 can be rotated past a single fixed welding position, and the welder does not have to move around and under the workpiece. This permits the entire welding operation to be carried out in a rapid and safe manner, and is readily adaptable to the use of automatic welding equipment.

For the purpose of rotating the workpiece, the automatic positioner 13 is provided with a vertical mounting table 14 having a horizontal axle 15 which is journaled in a stationary frame 16. A plurality of radial slots 14a are provided in the table 14 to receive the bolts which are conventionally used to attach the workpiece to the table. The table 14 is rotated by a motor 17 which is connected to the table through a suitable gear mechanism indicated at 18. Since automatic rotary welding positioners of this type are well known in the welding industry and are commercially available, there is no need to describe the positioner 13 in detail herein.

When the automatic positioner 13 is used for the welding of two straight sections of pipe, the free end of one of the sections is simply butted against the vertical table 14 and attached thereto in the conventional manner by welding a pair of small angles to the end of the section and then bolting the angles to the table 14. However, when the end of one of the sections is curved, as in the case of elbows and T-joints for example, the conventional mounting arrangement cannot be used.

In the practice of the present invention, there is provided an adapter for mounting curved workpieces such as elbows and the like on the vertical table of a rotary welding work positioner, which adapter comprises the combination of an expandable chuck having a plurality of elongated horizontal support members extending radially from a common central connecting member, a vertical control rod extending upwardly through the common central connecting member and being adjustably mounted to permit vertical movement of the control rod along its axis, a plurality of guide members each of which is slidably mounted on one of the support members, a plurality of alining arms each of which has an upper end pivotally connected to the upper end of the control rod and a lower end pivotally connected to one of the guide members whereby raising and lowering of the control rod respectively contracts and expands the alining arms, with the arms being guided by the sliding movement of the guide members along the support members, and a vertical mounting bracket attached to the radially outer end of one of the supporting members and adapted to be adjustably attached to the vertical mounting table of the automatic positioner. Thus, the particular adapter illustrated in the drawings includes an expandable chuck having three elongated support members 31a, 31b, and 31c which extend radially from a common connection disc 33 welded to all three support members, as at 32a. The three support members 31a, 31b, and 31c are of equal length and are equally spaced around the circumference of the disc 33, i.e., 180° apart. In the particular embodiment illustrated in the drawings, the three support members are in the form of U-shaped channels so that they may also serve as tracks for the guide members of the chuck, as described in more detail hereinafter.

In order to support the elbow section 12 to be driven by the rotary positioner 13, as shown in FIG. 1, the length of each supporting member 31a, 31b, and 31c must be at least as great as the radius of the free end 13a of the elbow. In other words, when the elbow section 12 is placed concentrically over the disc 33, the three radiating support members must extend beyond the edges of the lower end of the elbow so as to provide a tripod support for the elbow.

For the purpose of holding the elbow section 12 in proper horizontal alinement with the straight pipe section 10, i.e., to prevent the elbow 12 from slipping horizontally over the supporting surfaces of the members 31a, 31b, and 31c, the chuck assembly is provided with a vertical control rod 34 which extends up into the elbow to support the upper ends of three alining arms 35a, 35b, and 35c. These alining arms extend downwardly and outwardly from the upper end of the control rod 34 so as to engage the inside edge of the elbow 12 and thereby hold the elbow firmly in position.

In accordance with one aspect of this invention, the three alining arms 35a, 35b, and 35c are adapted to be expanded and contracted so that a single chuck can be used with a wide variety of different elbow sizes. Thus, the control rod 34 is threaded through the disc 33 and a threaded sleeve or nut 33a welded to the upper surface of the disc so as to permit vertical movement of the rod in the direction of its axis, and the three alining arms are pivotally mounted so as to be expanded and contracted by the lowering and raising, respectively, of the control arm. At their upper ends, the arms 35 are pivotally pinned in mating slots formed in a small plate 36 which is rigidly secured to the upper end of the rod 34. At their lower ends, the arms 35a, 35b, and 35c are pivotally pinned to small guide blocks 37a, 37b, and 37c which ride in the channels formed by the respective support members 31a, 31b, and 31c. It will be understood that different guiding arrangements may be provided at the lower ends of the alining arms 35, and the upper ends of the arms may be pivotally connected to the control rod 34 in any suitable manner. The lower end of the control rod 34 is provided with a knurled knob 38 to facilitate manual adjustment of the vertical position of the rod 34.

In order to permit the elbow 12 to be positioned in proper vertical alinement with the straight pipe section 10, the entire expandable chuck assembly is attached to a vertical mounting bracket 40 which is adapted to be adjustably attached to the vertical table 14 of the automatic positioner. As shown in FIG. 3, the mounting element 40 is provided with several longitudinal slots 41 which permit the mounting element to be attached, as by bolts 42, to the vertical table 14 at various vertical positions. Additional support for the chuck assembly is provided by a diagonal brace 43 extending from the lower portion of the element 40 to the underside of the support member 35a.

In the operation of the adapter of this invention, the elbow section 12 is initially positioned on the three supporting channels 31 of the chuck assembly with the alining arms 35 in their collapsed position, i.e., with the control rod 34 turned to its raised position and the guide blocks 37 in their radially inner positions close to the disc 33. After the elbow 12 has been positioned on the chuck assembly, the knob 38 is turned to lower the rod 34 and thereby expand the arms 35 until they all engage the inner edge of the elbow. It should be noted that if the elbow is not exactly centered on the chuck initially, the alining arms 35 tend to center the elbow as they are expanded in the radial direction. In order to move the elbow into proper vertical alinement with the straight section 10 to which it is to be welded, the entire chuck assembly is adjusted to the proper vertical position by sliding the mounting element 40 over the surface of the table 14. The chuck is then secured in that position by tightening the bolts 42 which fasten the element 40 to the table 14. At this point, the elbow 12 is exactly alined with the pipe 10, and the pipe 10 need only be butted against the end of the elbow. An initial weld is then made at one point of the joint to be welded, and the positioner is then started to rotate the workpiece as the welding operation proceeds.

While one specific form of the present invention has been illustrated and described in some detail herein, it will be understood that the same is susceptible of numerous modifications within the spirit and scope of the invention. For example, although the invention has been described with particular reference to an adapter having three equally spaced support members, alining arms, and guide members, it will be apparent that the number of these elements may be increased and that the spacing may be varied.

It can be seen that the adapter of this invention greatly facilitates conventional welding operations by permitting nonlinear workpieces such as elbows and the like to be quickly and conveniently attached to the vertical table of the automatic positioner without any supplemental welding, cutting, or grinding operations. Moreover, a single adapter can be used with a wide variety of different workpieces, and yet always holds the workpiece firmly in position during rotation thereof by the automatic positioner. Furthermore, the adapter enables the nonlinear workpiece to be accurately alined with the other piece to which it is to be welded by a relatively simple manual adjustment.

I claim as my invention:

1. In combination with an automatic welding work positioner having a vertical mounting table and driving means for rotating said table about a horizontal axis, an adapter for mounting nonlinear workpieces such as elbows and the like on said table, said adapter comprising the combination of an expandable chuck having a plurality of elongated horizontal support members extending radially from a common central connecting member, a vertical control rod extending upwardly through the central connecting member and being adjustably mounted to permit vertical movement of the control rod along its axis, a plurality of guide members each of which is slidably mounted on one of said support members, a plurality of alining arms each of which has an upper end pivotally connected to the upper end of said control rod and a lower end pivotally connected to one of the guide members whereby raising and lowering of the control rod respectively contracts and expands the alining arms, and a vertical mounting bracket attached to the radially outer end of one of said support members and adapted to be adjustably attached to the vertical mounting table of the automatic positioner.

2. In combination with an automatic welding work positioner having a vertical mounting table and driving means for rotating said table about a horizontal axis, an adapter for mounting nonlinear workpieces such as elbows and the like on said table, said adapter comprising the combination of an expandable chuck having a plurality of elongated horizontal channel members extending radially from a common central connecting member having a central threaded aperture therein, said channel members being equally spaced around the circumference of said aperture, a vertical control rod threaded through the aperture in said connecting member and projecting above said channel members whereby the upper portion of said control rod may be raised and lowered with respect to said channel members, a plurality of guide blocks each of which is slidably mounted in one of said channel members, a plurality of alining arms each of which has an upper end pivotally connected to the upper portion of said control rod above said channel members and a lower end pivotally connected to one of said guide blocks whereby raising and lowering of said control rod contracts and expands said arms with the arms being guided by the sliding movement of said blocks in said channels, and a vertical mounting bracket attached to one of said channel members and adapted to be adjustably attached to the vertical mounting table of the automatic positioner.

3. In combination with an automatic welding work positioner having a vertical mounting table and driving means for rotating said table about a horizontal axis, an adapter for mounting nonlinear workpieces such as elbows and the like on said table, said adapter comprising the combination of an expandable chuck having a substantially horizontal supporting assembly for supporting an open end of the nonlinear workpiece, said supporting assembly having a central aperture therein and a plurality of track means extending radially from said aperture, a vertical control rod extending upwardly through said aperture and being adjustably mounted to permit the upper portion of said rod to be raised and lowered with respect to said supporting assembly, a plurality of guide members mounted on said supporting assembly for movement along said tracks, a plurality of alining members each of which has an upper end pivotally connected to the upper portion of said control rod and a lower end pivotally connected to one of said guide members whereby raising and lowering of the control rod respectively contracts and expands the alining arms with said guide members moving along said tracks, and a vertical mounting bracket attached to the radially outer end of one of said support members and adapted to be adjustably attached to the vertical mounting table of the automatic positioner.

4. In combination with an automatic welding work positioner having a vertical mounting table and driving means for rotating said table about a horizontal axis, an adapter for mounting nonlinear workpieces such as elbows and the like on said table, said adapter comprising the combination of an expandable chuck having a horizontal supporting assembly adapted to support an open end of the nonlinear workpiece, said supporting assembly having a central threaded aperture therein and a plurality of elongated channels spaced circumferentially around said aperture and extending radially from said aperture, a vertical control rod threaded through said aperture and projecting above said supporting assembly whereby the upper portion of said control rod may be raised and lowered with respect to said supporting assembly, a knob on the lower end of said rod for manually adjusting the rod, a plurality of guide members each of which is slidably mounted in one of said channels, a plurality of alining arms each of which has an upper end pivotally connected to the upper portion of said control rod above said supporting assembly and a lower end pivotally connected to one of said guide blocks whereby raising and lowering of said control rod respectively contracts and expands said arms in the radial directions with said guide members riding along said channels, and a vertical mounting bracket attached to the outer edge of said supporting assembly, said mounting bracket including means for attaching the bracket at various vertical positions on the mounting table of the automatic positioner.

No references cited.

WHITMORE A. WILTZ, *Primary Examiner.*